(12) United States Patent
Xiang et al.

(10) Patent No.: US 11,681,661 B2
(45) Date of Patent: Jun. 20, 2023

(54) HYBRID SYNCHRONIZATION USING A SHADOW COMPONENT

(71) Applicant: VMWARE, INC., Palo Alto, CA (US)

(72) Inventors: Enning Xiang, San Jose, CA (US);
Eric Knauft, San Francisco, CA (US);
Pascal Renauld, Palo Alto, CA (US);
Yiqi Xu, Redwood City, CA (US);
Pratik Desai, San Jose, CA (US);
Yizhou Luo, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 192 days.

(21) Appl. No.: 17/106,037

(22) Filed: Nov. 27, 2020

(65) Prior Publication Data
US 2022/0171739 A1 Jun. 2, 2022

(51) Int. Cl.
*G06F 16/00* (2019.01)
*G06F 16/178* (2019.01)
(Continued)

(52) U.S. Cl.
CPC .......... *G06F 16/178* (2019.01); *G06F 3/0604* (2013.01); *G06F 3/065* (2013.01);
(Continued)

(58) Field of Classification Search
CPC .. G06F 16/178; G06F 16/1844; G06F 16/125; G06F 16/1767; G06F 16/1824;
(Continued)

(56) References Cited

U.S. PATENT DOCUMENTS 1,114,440 A * 10/1914 Brix ....................... B62K 23/04
74/488
7,325,110 B2 * 1/2008 Kubo .................. G06F 11/1466
711/147
(Continued)

FOREIGN PATENT DOCUMENTS

WO WO2011060965 A1 * 5/2011
WO WO2014055446 A1 * 4/2014
(Continued)

OTHER PUBLICATIONS

M. Satyanarayanan et al.,"On the ubiquity of logging in distributed file systems", Proceedings Third Workshop on Workstation Operating Systems, Apr. 1992.*
(Continued)

*Primary Examiner* — Srirama Channavajjala
(74) *Attorney, Agent, or Firm* — Barta, Jones & Foley, PLLC

(57) ABSTRACT

Hybrid synchronization using a shadow component includes detecting a first component of a plurality of mirrored components of a distributed data object becoming unavailable. The mirrored components include a delta component (a special shadow component) and a regular mirror (shadow) component. The delta component indicates a shorter history of changes to data blocks of a log-structured file system (LFS) than is indicated by the regular mirror component. During the unavailability of the first component, at least one write I/O is committed by the delta component. The commit is tracked by the delta component in a first tracking bitmap associated with the delta component. Based at least on detecting the first component becoming available, the first component is synchronized with data from the delta component, based at least on changed data blocks indicated in the first tracking bitmap.

20 Claims, 9 Drawing Sheets

(51) Int. Cl.
*G06F 16/11* (2019.01)
*G06F 16/176* (2019.01)
*G06F 3/06* (2006.01)
*G06F 16/182* (2019.01)
*G06F 16/188* (2019.01)

(52) U.S. Cl.
CPC ............ *G06F 3/067* (2013.01); *G06F 16/125* (2019.01); *G06F 16/128* (2019.01); *G06F 16/1767* (2019.01); *G06F 16/188* (2019.01); *G06F 16/1824* (2019.01); *G06F 16/1844* (2019.01)

(58) Field of Classification Search
CPC ...... G06F 16/188; G06F 16/128; G06F 16/27; G06F 16/2379; G06F 16/1834; G06F 9/547; G06F 11/2076; G06F 11/2079; G06F 3/065; G06F 3/0604; G06Q 20/065; G06Q 20/282
See application file for complete search history.

(56) References Cited

U.S. PATENT DOCUMENTS

| | | | | |
|---|---|---|---|---|
| 7,734,815 B2* | 6/2010 | Leighton | ............... | H04L 67/101 709/241 |
| 8,195,760 B2* | 6/2012 | Lacapra | ............... | G06F 11/1076 709/215 |
| 8,554,741 B1* | 10/2013 | Malina | ................ | G06F 11/1471 707/674 |
| 9,158,540 B1* | 10/2015 | Tzelnic | ................ | G06F 11/108 |
| 9,805,106 B2* | 10/2017 | McErlean | ................. | G06F 8/61 |
| 10,776,104 B2* | 9/2020 | Ben Ari | ..................... | G06F 8/71 |
| 11,176,005 B2* | 11/2021 | Kashyap | ............... | G06F 16/122 |
| 2002/0083281 A1* | 6/2002 | Carteau | ............... | G06F 11/2079 714/E11.108 |
| 2003/0212869 A1* | 11/2003 | Burkey | ............... | G06F 11/1461 711/135 |
| 2004/0226021 A1* | 11/2004 | Miki | .................... | G06F 11/2071 719/313 |
| 2007/0094466 A1* | 4/2007 | Sharma | ............... | H04L 67/1097 711/162 |
| 2013/0159364 A1* | 6/2013 | Grider | ................. | G06F 16/1865 707/826 |
| 2018/0032257 A1* | 2/2018 | Xiang | ..................... | G06F 3/067 |
| 2020/0242129 A1* | 7/2020 | Botev | ................. | G06F 16/1805 |
| 2020/0342456 A1* | 10/2020 | Krishnaswamy | ..... | H04L 9/3239 |

FOREIGN PATENT DOCUMENTS

| | | | |
|---|---|---|---|
| WO | WO2015023897 | A1 * | 2/2015 |
| WO | WO2015183383 | A1 * | 12/2015 |
| WO | WO2018093631 | A1 * | 5/2018 |

OTHER PUBLICATIONS

P. Tabuada et al "Discrete synchronization of hybrid systems", Proceedings of the 41st IEEE Conference on Decision and Control Dec. 2002, pp. 22-27.*
Odgers, Josh, "Nutanix Resiliency—Part 6—Write I/O during CVM maintenance or failures", Cloud XC, Jun. 8, 2018, 5 pages.
Unknown, "Consistent hashing", Wikipedia, https://en.wikipedia.org/wiki/Consistent_hashing, Aug. 13, 2020, 5 pages.

* cited by examiner

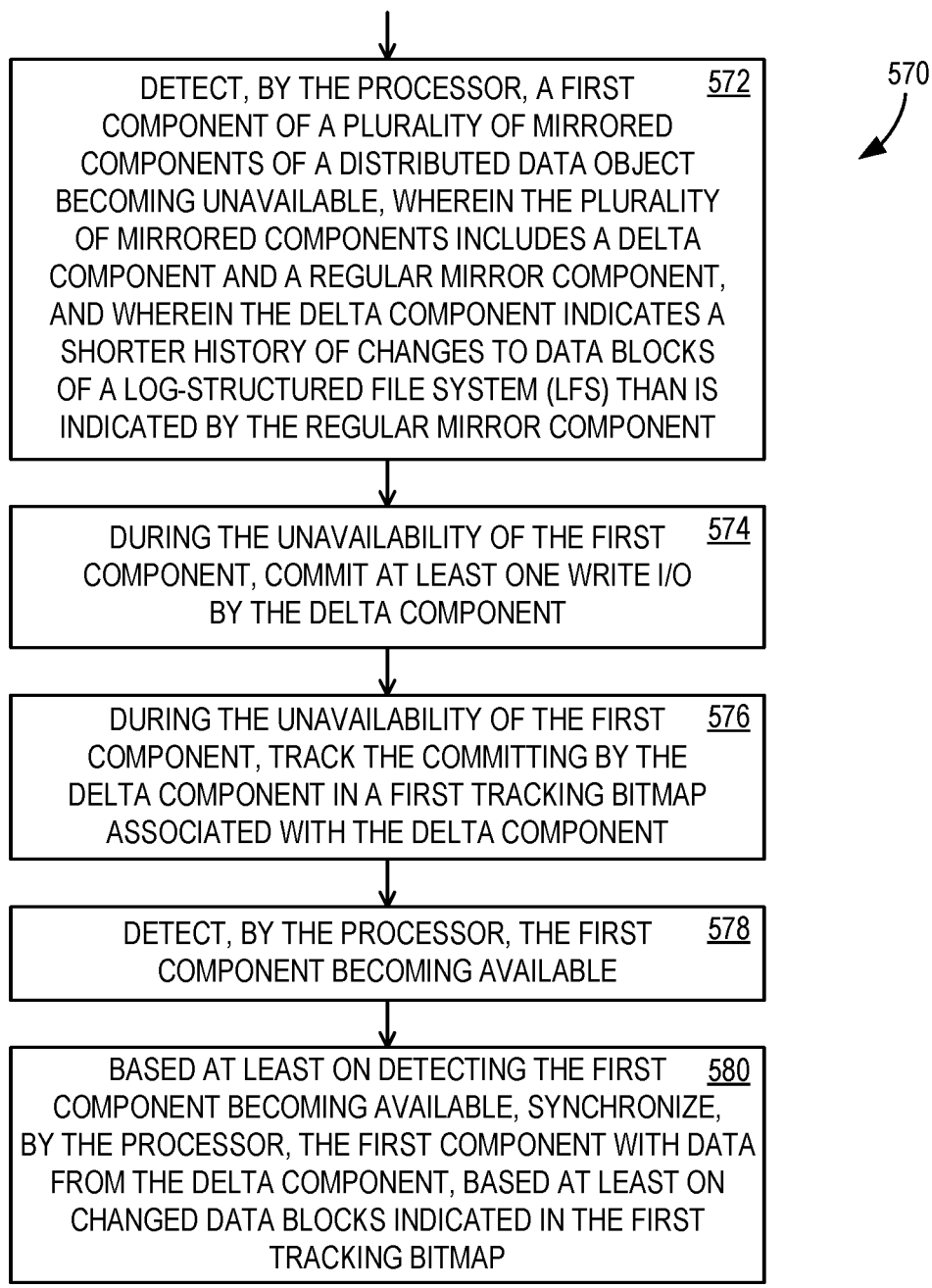

HYBRID SYNCHRONIZATION USING A SHADOW COMPONENT

BACKGROUND

Distributed data objects may have multiple data components that are mirrored in order to provide redundancy, improving the reliability of storage solutions for the data stored thereon. In some scenarios, a data component becomes absent (e.g., unavailable) for a period of time, preventing that data component from storing incoming data writes (write I/Os). When that data component does become available again, it is stale, because it does not include any changes to the stored data that had occurred during its period of absence. The stale data component thus requires synchronization (e.g., resynchronization), to bring it back to a properly updated (synchronized) state. Some synchronization schemes may use a bitmap-based solution with a mirror component, in which each bit in the bitmap flags whether a corresponding group of blocks had been changed in the mirror component, and thus may indicate a need to update the corresponding portion of the stale data component. Bitmap-based synchronizing may offer advantageous efficiency over synchronization based on a replay of a log.

However, in order to keep the bitmap from growing too large, each bit in the bitmap may correspond to a group of blocks having a count in the range of tens or more of data blocks, rather than each bit in the bitmap corresponding to only a single data block. For example, with a 128 kilobyte (KB) bitmap, each bit of a bitmap for a 256 gigabyte (GB) sized component represents 256 KB of data. If the component stores data using a 4 KB data block size, each bit of the bitmap represents 64 data blocks. If only a single one of those 64 data blocks had changed, the bit will be set to indicate that an update is needed for that group of 64 blocks. This may lead to write amplification during synchronization, for example, writing all 64 data block that correspond to a single bitmap bit, rather than writing perhaps as little as just a single data block.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the disclosure provide for hybrid synchronization using a shadow component, and which includes: detecting a first component of a plurality of mirrored components of a distributed data object becoming unavailable, wherein the plurality of mirrored components includes a delta component (a special shadow component) and a regular mirror (shadow) component, and wherein the delta component indicates a shorter history of changes to data blocks of a log-structured file system (LFS) than is indicated by the regular mirror component; during the unavailability of the first component, committing at least one write input/output (I/O) by the delta component and tracking the committing by the delta component in a first tracking bitmap associated with the delta component; detecting the first component becoming available; and based at least on detecting the first component becoming available, synchronizing the first component with data from the delta component, based at least on changed data blocks indicated in the first tracking bitmap.

BRIEF DESCRIPTION OF THE DRAWINGS

The present description will be better understood from the following detailed description read in the light of the accompanying drawings, wherein:

FIG. 5B illustrates another flowchart of exemplary operations associated with the architecture of FIG. 1;

DETAILED DESCRIPTION

Figure 1A:
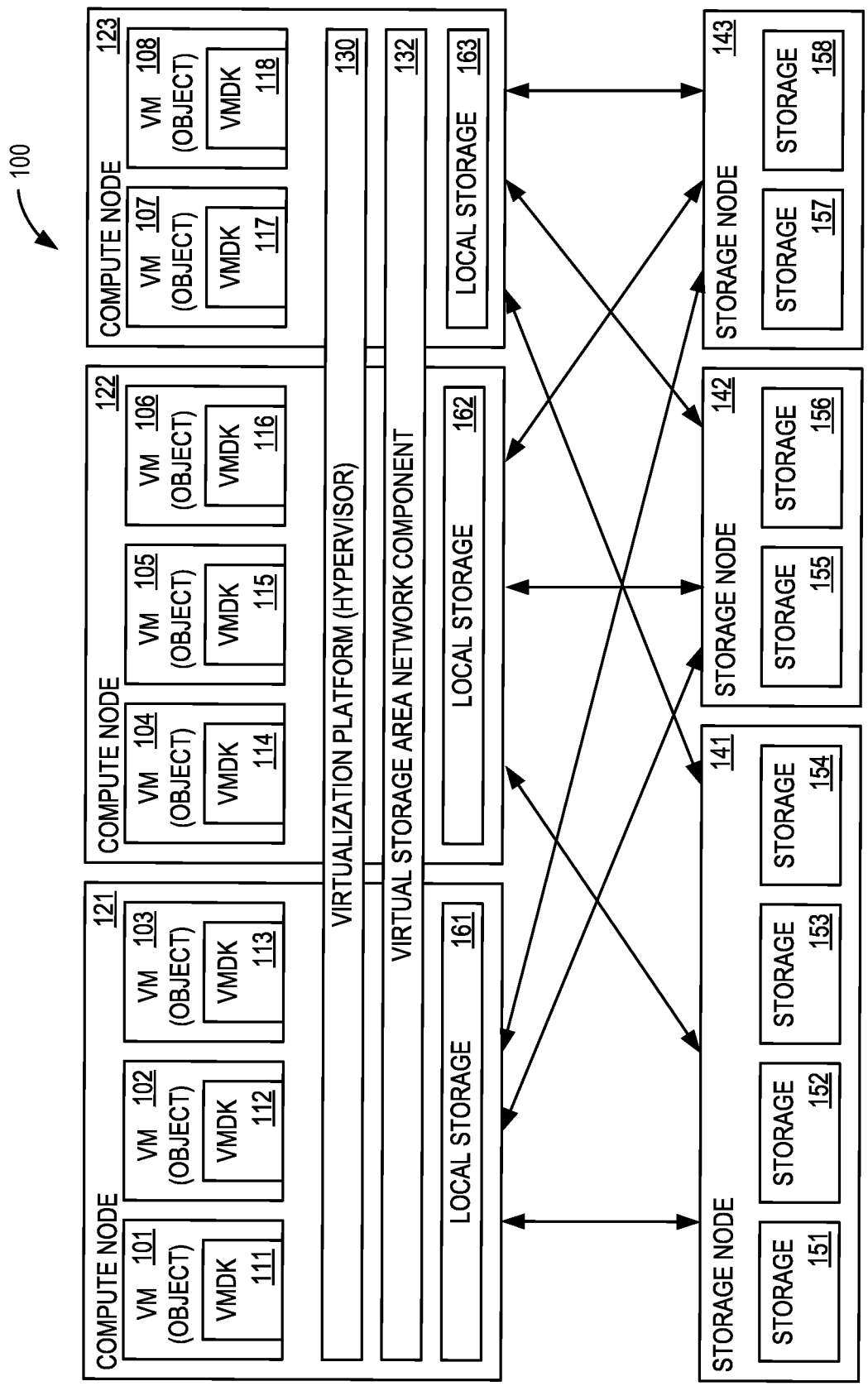
FIG. 1A illustrates an architecture that may advantageously employ hybrid synchronization using a shadow component.

Aspects of the disclosure provide for hybrid synchronization using a shadow component. The disclosure improves the reliability and speed of computer storage (e.g., speeding synchronization) because synchronizing with the delta component may reduce write amplification when compared to synchronizing with the regular mirror component. Reducing write amplification reduces the number of bits written, improving the speed of synchronization. In some examples, the delta component has a shorter lifespan than the data component being synchronized and also a shorter lifespan than the regular mirror component. This may result in the delta component having fewer changed blocks to be copied during synchronization, because the delta component has not been accumulating write input/output events (write I/Os) for as long as the regular mirror component has been doing so. The regular mirror component is available for use as a back-up synchronization source for scenarios in which the delta component does not have valid data.

Aspects of the disclosure thus operate in an unconventional manner at least by synchronizing the data component with data from the delta component, based at least on changed data blocks indicated in a tracking bitmap. This approach may be characterized as hybrid because it is able to use either or both of the delta component and a regular mirror component for synchronization of a stale component. In some examples, the regular mirror component is used when the delta component does not have a valid tracking bitmap. In some examples, the regular mirror component is used when the delta component does not have a valid tracking bitmap. In some examples, the regular mirror component may also be used as an additional data source even when the delta component does have a valid tracking bitmap.

Distributed data objects may be configured to store data spread out among multiple hardware devices and physical locations to both secure the data against loss due to hardware failure, software failure, or for other reasons (data durability), and to enable access to the stored data despite periodic downtimes for individual devices (data availability). Providing these features typically includes storing the data redundantly (e.g., storing the same data on multiple devices and/or in multiple locations) within data components of the distributed data object, such that, in the event that one server device fails, the data is still accessible on another server device that stores the data. For instance, data components of a distributed data object may include components configured to store a subset of the total data associated with the distributed data object, such that the total data is stored across multiple components and/or components that mirror each other. That is, the data of the distributed data object is stored redundantly on multiple components (e.g., the base components and mirrored components described herein). When a component of the distributed data object is going to become unavailable, the data durability and availability is reduced for the time period during which the component is unavailable and, when the component becomes available again, it may be in a stale state and require synchronization with an up-to-date component.

In the described distributed data object systems, a tracking bitmap mechanism includes the process of each active mirrored component starting a new tracking bitmap when another mirrored component goes offline or otherwise becomes unavailable (absent). The tracking bitmap may be managed by each local component independently and changes are marked into the bitmap when data changes are committed by the local component. Each bitmap tracks incoming data writes to the component since the last committed write input/output (I/O) at the time and the log sequence number (LSN) of that write I/O is associated with the bitmap as the starting LSN. When an unavailable component becomes available again and is stale, a synchronization bitmap is started on the stale component, as described herein. This synchronization bitmap enables the stale component to rebuild the change tracking information associated with the write I/Os that were missed by the stale component during the downtime (duration of the absence).

However, to reduce write amplification, a hybrid synchronization (resync) algorithm is introduced to advantageously employ a special shadow (mirror) component termed a delta component. An initially-empty delta component may be associated with a particular base component for use in synchronizing the base component after an upcoming planned outage, such as a maintenance operation to be performed on the base component. In some scenarios, the delta component and the associated base component have the same address space, and are thus direct siblings. They both receive the same guest write I/Os, although the delta component may have a shorter lifespan than its associated base component. When the base component goes offline, the delta component is still able to receive guest write I/Os and it will start a tracking bitmap to track incoming guest write I/Os for the offline (absent, unavailable) base component, similarly to regular mirror components. However, in some scenarios, the base component will be shut down temporarily, after the delta component is prepared (initially empty), so the delta component contains predominantly (or, in some cases, only) the data that the base component missed during its absence.

For example, a regular mirror component may be operating long-term, collecting the entire history of committed writes as a base component, whereas a delta component is initiated upon a planned outage of the base component. As a result of its shorter lifespan (e.g., being initiated upon the planned outage of the base component, rather than having operated for a longer term), the delta component will have a shorter history of changes than the regular mirror component. That is, the majority of additional written blocks for regular mirror components, which may have been operating for an extended period of time prior to the absence of the base component, will not have accumulated in the delta component. When synchronizing the base component using the delta component, the pre-absence accumulation of additional written blocks will be filtered out using a written status check of the delta component's data blocks. In this way, the write I/O amplification is reduced by using the delta component for synchronization, in place of using a regular mirror component.

As an additional advantage, in some scenarios, a delta component may also be used to synchronize an indirect sibling (e.g., another mirror component). This opportunistic use may be advantageously employed when the indirect sibling has an unexpected outage and the delta component had serendipitously been prepared in time. This usefulness of a delta component for synchronization may be ascertained by whether the delta component has a valid tracking bitmap for the stale component (direct or indirect). When each component goes absent, a LSN (log sequence number) of the first guest write I/O, that the absent component missed, is identified as a stale LSN. When the component becomes available again, it is stale (due to the missed write I/Os), and the stale LSN is used to query other active mirror components (including the delta component) for a tracking bitmap that at least contains all guest write I/Os since the stale LSN. If the indirect sibling component becomes absent before the delta component is added, the delta component returns tracking a bitmap with stale LSN equal to one (1), which may be interpreted as a flag that the delta component does not have the needed date to synchronize the indirect sibling component. A stale LSN value greater than one (1) may indicate a valid tracking bitmap for synchronization.

FIG. 1A illustrates an architecture 100 that may advantageously employ hybrid synchronization using a shadow component, for example for a log-structured file system (LFS). Architecture 100 is comprised of a set of compute nodes 121-123 interconnected with each other and a set of storage nodes 141-143 according to an embodiment. In other examples, a different number of compute nodes and storage nodes may be used. Each compute node hosts multiple objects, which may be virtual machines (VMs), containers, applications, or any compute entity that can consume storage. When objects are created, they are designated as global or local, and the designation is stored in an attribute. For example, compute node 121 hosts objects 101, 102, and 103; compute node 122 hosts objects 104, 105, and 106; and compute node 123 hosts objects 107 and 108. Some of objects 101-108 are local objects. In some examples, a single compute node may host 50, 100, or a different number of objects. Each object uses a virtual machine disk (VMDK), for example VMDKs 111-118 for each of objects 101-108, respectively. Other implementations using different formats are also possible. A virtualization platform 130, which includes hypervisor functionality at one or more of computer nodes 121, 122, and 123, manages objects 101-108. In some examples, various components of architecture 100, for example compute nodes 121, 122, and 123, and storage nodes 141, 142, and 143 are implemented using one or more computing apparatuses 618 of FIG. 6.

Virtualization software that provides software-defined storage (SDS), by pooling storage nodes across a cluster, creates a distributed, shared data store, for example a storage area network (SAN). In some distributed arrangements, servers are distinguished as compute nodes (e.g., compute nodes 121, 122, and 123) and storage nodes (e.g., storage nodes 141, 142, and 143). Although a storage node may attach a large number of storage devices (e.g., flash, solid state drives (SSDs), non-volatile memory express (NVMe), Persistent Memory (PMEM), quad-level cell (QLC)) processing power may be limited beyond the ability to handle input/output (I/O) traffic. During data writes to storage devices, a phenomenon termed write amplification may occur, in which more data is written to the physical media than was sent for writing in the I/O. Write amplification is an inefficiency that produces unfavorable I/O delays and may arise as a result of synchronization between mirrored components to bring a stale component up to date, as described herein.

Storage nodes 141-143 each include multiple physical storage components, which may include flash, SSD), NVMe, PMEM, and QLC storage solutions. For example, storage node 141 has storage 151, 152, 152, and 154; storage node 142 has storage 155 and 156; and storage node 143 has storage 157 and 158. In some examples, a single storage node may include a different number of physical storage components. In the described examples, storage nodes 141-143 are treated as a SAN with a single global object, enabling any of objects 101-108 to write to and read from any of storage 151-158 using a virtual SAN component 132. Virtual SAN component 132 executes in compute nodes 121-123. Thin-provisioning may be used, and in some examples, storage nodes 141-143 do not require significantly more processing power than is needed for handling I/O traffic. This arrangement may be less expensive than in an alternative hyperconverged environment in which all of storage nodes 141-143 have the same or similar processing capability as compute node 121. Using the disclosure, compute nodes 121-123 are able to operate with a wide range of storage options.

In some examples, compute nodes 121-123 each include a manifestation of virtualization platform 130 and virtual SAN component 132. Virtualization platform 130 manages the generating, operations, and clean-up of objects 101 and 102. Virtual SAN component 132 permits objects 101 and 102 to write incoming data from object 101 and incoming data from object 102 to storage nodes 141, 142, and/or 143, in part, by virtualizing the physical storage components of the storage nodes.

Figure 1B:
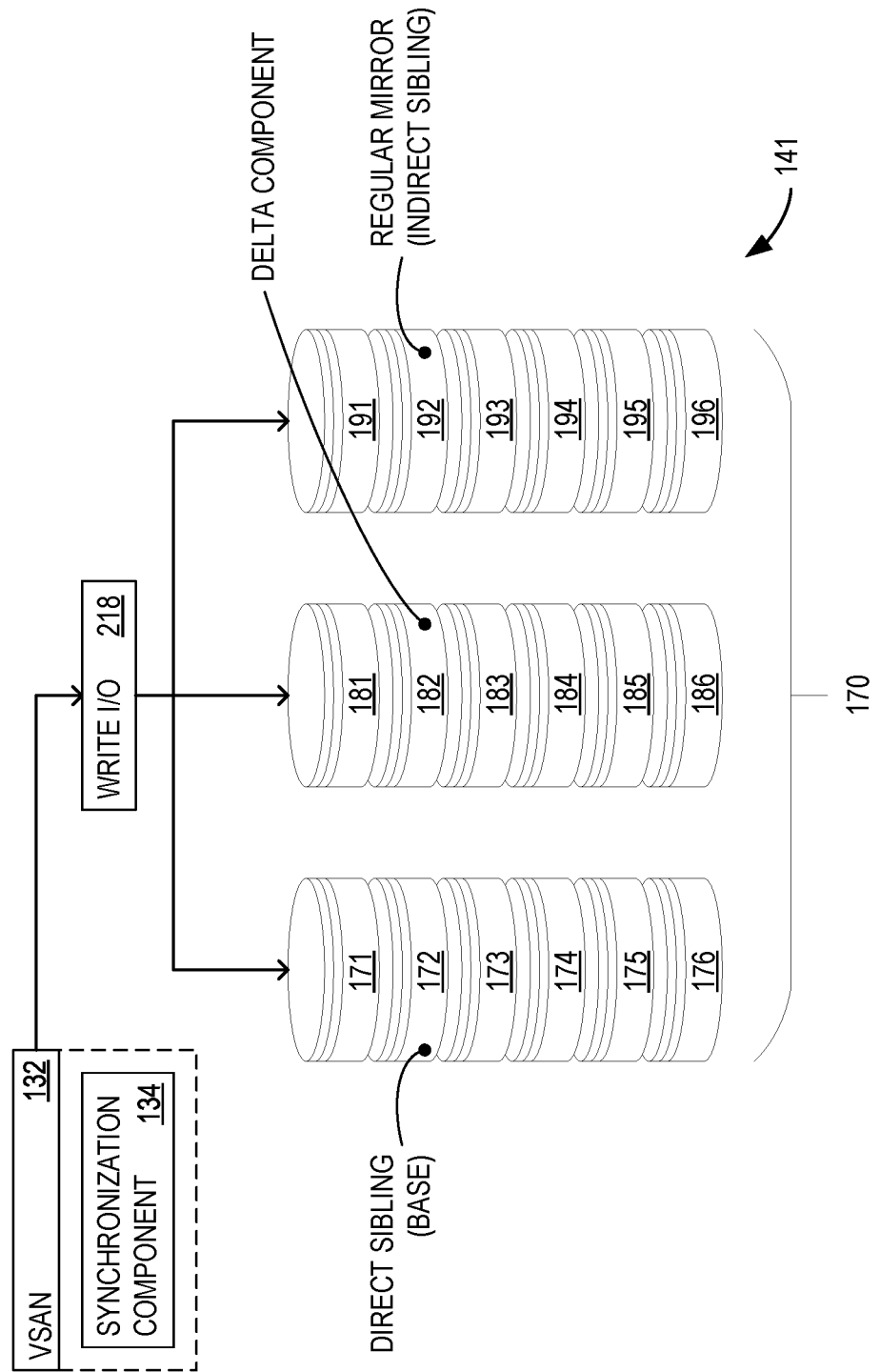
FIG. 1B illustrates additional detail for the architecture of FIG. 1A.

FIG. 1B illustrates additional detail for a portion of architecture 100, for example storage node 141. Virtual SAN component 132 sends a write I/O 218 to a plurality of mirrored components 170, which includes components 171-176, 181-186, and 191-196 in a mirror arrangement. Plurality of mirrored components 170 may correspond to one or more of storage 151-154 of FIG. 1A. A base component 172 is a direct sibling of a delta component 182, and also has a regular mirror component 192 (which may also be referred to as an indirect sibling).

A synchronization component 134 performs or manages operations described herein to synchronize base component 172 and/or regular mirror component 192 using delta component 182. This provides advantageous operation when synchronizing base component 172 with delta component 182 is more efficient than synchronizing base component 172 with regular mirror component 192, or when regular mirror component 192 fails and may be synchronized using delta component 182. In some examples, synchronization component 134 may be part of virtual SAN component 132. Although only a single one of each delta component 182 and regular mirror component 192 are shown, in some examples, there may be multiple ones of each component.

Figure 2A:
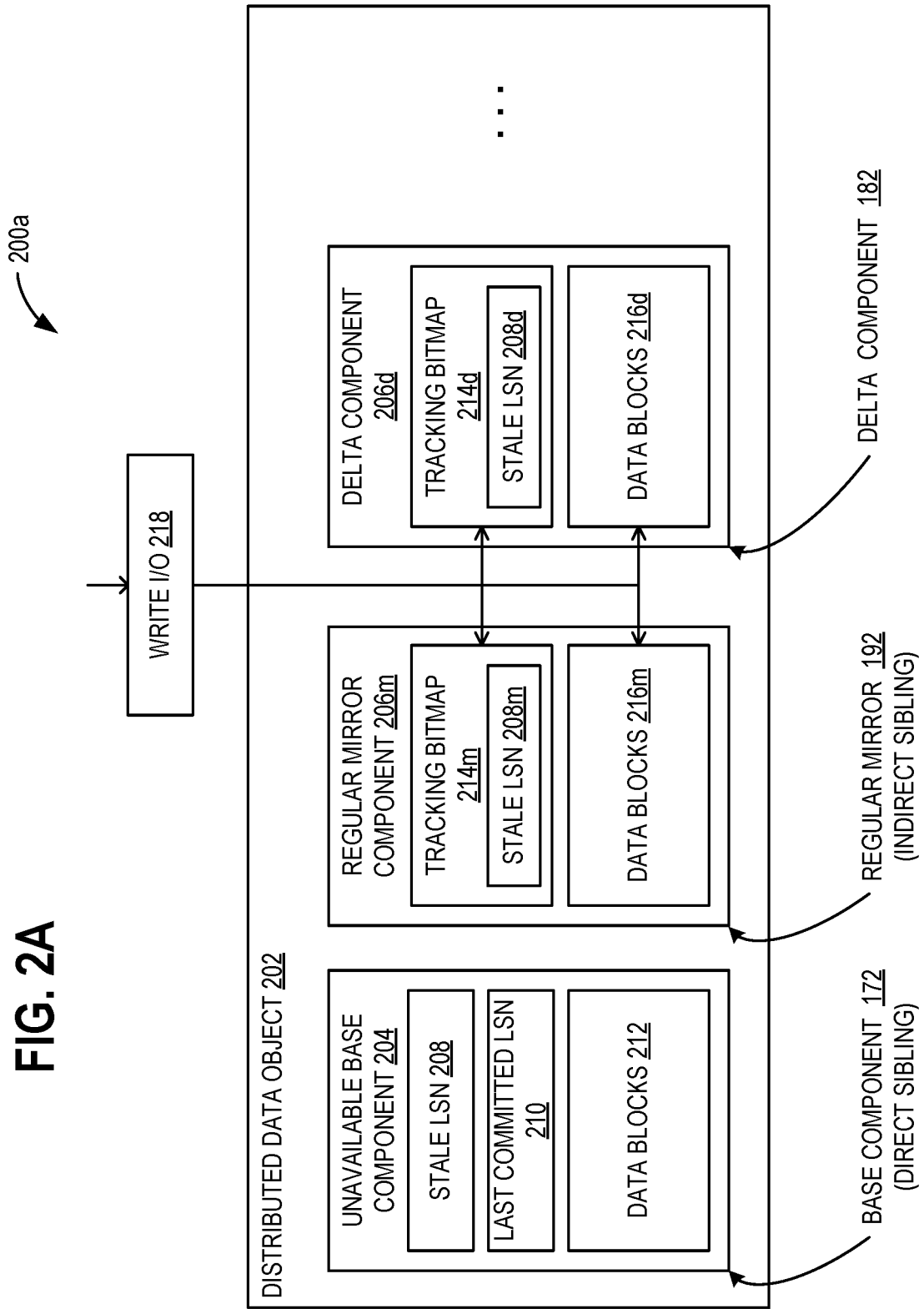
FIGS. 2A and 2B are block diagrams illustrating managing mirrored data components of a distributed data object in the architecture of FIG. 1A, when some data components are unavailable or stale.
Figure 2B:
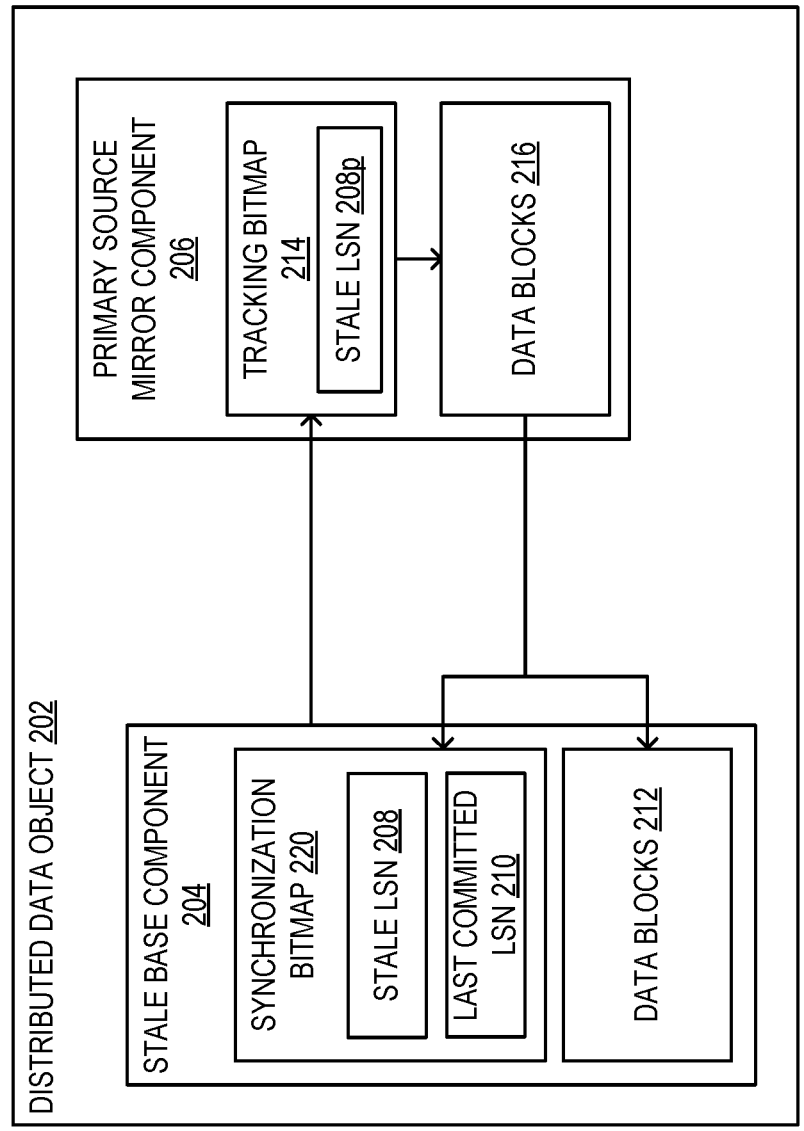

FIGS. 2A and 2B are block diagrams 200a and 200b illustrating data flows for managing mirrored data components of a distributed data object 202. Whereas FIG. 1A (and FIG. 3, later) are labeled based on relationships among components from the perspective of delta component 182, FIGS. 2A and 2B are labeled differently to reflect changing relationships among components from the perspective of a base component 204 (representing base component 172) as it passes through states of unavailability and being stale. In FIG. 2A, delta component 206d corresponds to delta component 182 and regular mirror component 206m corresponds to regular mirror component 192. As a preview, FIG. 2B shows a primary source mirror component 206, which corresponds to either delta component 206d or regular mirror component 206m, whichever is selected as the primary mirror source, as described below in relation to FIG. 5.

Distributed data object 202 is part of a virtual storage network component or virtual SAN component 132 of FIG. 1A, as described above, and block diagram 200a illustrates a state of distributed data object 202 when base component 204 is unavailable and delta component 206d and regular mirror component 206m are active. Distributed data object 202 is configured to store data across a plurality of data components (data structures configured to store at least a portion of the total data associated with the distributed data object 202), such as base component 204, delta component 206d, and regular mirror component 206m. In some examples, distributed data object 202 stores data redundantly across multiple components. For instance, multiple copies of a set of data may be stored on each of the base component 20, delta component 206d, and regular mirror component 206m, such that the data is preserved in the event that one or some of the components fail. Distributed data object 202 may be configured to provide enhanced reliability and availability of the stored data through the redundant storage of data on the multiple components, enabling the data to be accessed despite failure or unavailability of individual components.

While base component 204 is labeled differently from regular mirror component 206m, in some examples, base component 204 is effectively identical to regular mirror component 206m. Further, the described functionality may also apply to components of the distributed data object 202 other than the base component 204 and or associated mirrored components in other examples. Further, in some examples, distributed data object 202 may include more and/or different components than as illustrated in FIGS. 2A and 2B, without departing from the description herein. For instance, distributed data object 202 may be configured to include four mirrored components, or a larger number, to enhance the data durability and security of distributed data object 202.

As illustrated in FIG. 2A, base component 204 is unavailable. Base component 204 may have become unavailable due to failure of an associated host and/or network connection, the associated host being deactivated for maintenance, or another reason. When it is detected that base component 204 is unavailable, regular mirror component 206m, which is configured to store the same data as base component 204, is configured to begin tracking changes to the data of the address space that base component 204 and regular mirror component 206m share (e.g., data blocks 212 and 216m respectively), such that the tracked changes can be used to bring base component 204 up to date through a synchronization process if and/or when base component 204 becomes available again. Because base component 204 is a direct sibling of delta component 206d, base component 204 and delta component 206d share the same address space (e.g., data blocks 212 and data blocks 216d respectively).

Changes to the data stored in the components 204, 206d, and 206m are in the form of I/O instructions, commands, or messages that write data values to data addresses within the shared address space of the components 204 and 206. Such I/O instructions may be known as "write I/O" (e.g., write I/O 218). Each instance of a write I/O is assigned an LSN, which provides sequencing information that is used for a variety of operations within the distributed data object and/or associated components (e.g., synchronization of mirrored components as described herein).

When base component 204 becomes unavailable, it is associated with a stale LSN 208 and a last committed LSN 210. Stale LSN 208 is the LSN of the write I/O that is the last write I/O committed on all active mirrored components. While stale LSN 208 is shown in base component 204, in some examples, the stale LSN of the base component 204 (based on its unavailability) may be determined by other active mirrored components, such as regular mirror component 206m, rather than by base component 204, which may have become unavailable suddenly due to a hardware failure or the like. In some examples, a stale LSN of a component that has become unavailable is persisted or otherwise provided for use by other active mirrored components in creating and maintaining tracking bitmaps and/or performing or otherwise participating in synchronization of associated stale components, for example a stale LSN 208d (in delta component 206d) and a stale LSN 208m (in regular mirror component 206m). Additionally, unavailable base component 204 is associated with a last committed LSN 210, which indicates the LSN of the last write I/O that was committed by base component 204 specifically. In some cases, stale LSN 208 and last committed LSN 210 are the same value, but in other cases, based on the timing of base component 204 becoming unavailable, it is possible that base component 204 committed one or more additional write I/Os (prior to becoming unavailable) that active mirrored components had not committed at the time of base component 204's unavailability determination. An example described with respect to FIG. 3 below illustrates such a case.

Based on the unavailability of base component 204, regular mirror component 206m is configured to create a tracking bitmap 214m, associated with stale LSN 208 of base component 204. When base component 204 is a direct sibling of delta component 206d, delta component 206d is also configured to create a tracking bitmap 214d, associated with stale LSN 208 of base component 204. Otherwise, delta component 206d may have been configured to track changes to another unavailable component, and may have overlapping address space, which renders tracking bitmap 214d useful in synchronizing base component 204, as described in relation to FIG. 2B.

Tracking bitmap 214d and tracking bitmap 214m may be used to track changes made to data blocks 216d and data blocks 216m, while base component 204 is unavailable. By tracking which data blocks of data blocks 216d and 216m are changed during the downtime of base component 204, base component 204 may be brought up to date by synchronizing only those changed data blocks as indicated in tracking bitmap 214d or 214m (whichever is used, as described below). In some examples, tracking bitmaps 214d and 214m are configured to include a plurality of data bits with each data bit mapping to one or more individual data blocks within the address space of the component. The data bits of the tracking bitmap may be initialized to '0' and, upon write I/Os (e.g., write I/O 218) causing data in a data block (or group of data blocks) to change, the associated component updates the mapped data bit of the data block to be a '1', indicating that that data block will need to be provided to the base component 204 to bring it up to date later. As illustrated, write I/O 218 represents one or more write I/O's that are provided to the distributed data object 202 and specifically targeted at the address space with which base component 204 and regular mirror component 206m are associated (and in some examples, also delta component 206d). The write I/O 218 is provided to the distributed data object 202 and causes changes to be made to one or more data blocks of the data blocks 216d of delta component 206d, data blocks 216m of regular mirror component 206m, and any other active mirrored components associated with the address space. The bits in tracking bitmaps 214d and 214m associated with the one or more data blocks that are changed are set to a value indicating that the data blocks have been changed. As shown, at least tracking bitmap 214m is associated with stale LSN 208 of unavailable base component 204, such that the components are enabled to identify it as a tracking bitmap that indicates all the changes made to data blocks in the address space since the write I/O associated with stale LSN 208 was committed to base component 204 and regular mirror component 206m.

FIG. 2B is a block diagram 200b illustrating a state of distributed data object 202 when the base component 204 has become available and is stale (the component is available but is not synchronized with other up-to-date mirrored components) and a primary source mirror component 206 is active. Primary source mirror component 206 corresponds to either delta component 206d or regular mirror component 206m, whichever is selected as the primary mirror source, as described below in relation to FIG. 5. Tracking bitmap 214 and data blocks 216 then correspond to tracking bitmap 214d and data blocks 216d when delta component 206d is selected as primary source mirror component 206, but tracking bitmap 214 and data blocks 216 instead correspond to tracking bitmap 214m and data blocks 216m when regular mirror component 206m is selected as primary source mirror component 206.

When base component 204 becomes available (e.g., it comes back online after an associated host device is restarted after a failure or maintenance period), base component 204, or an associated component associated with distributed data object 202, creates a synchronization bitmap 220 in, or otherwise associated with, base component 204. Synchronization bitmap 220 includes stale LSN 208 and last committed LSN 210 of base component 204, which may be used during future synchronization operations as described herein. Stale LSN 208 and last committed LSN 210 associated with synchronization bitmap 220 indicate a point in time after which the changes tracked in synchronization bitmap 220 occurred, relative to the LSNs of write I/Os. For instance, if stale LSN 208 of synchronization bitmap 220 is 50, that would indicate that the changes tracked in synchronization bitmap 220 are associated with write I/O's with LSNs of 51 or greater that originally occurred after the write I/O associated with LSN 50.

Synchronization bitmap 220 is configured to function in a similar manner as tracking bitmap 214 and/or other tracking bitmaps, as described above. For instance, in some examples, synchronization bitmap 220 includes a plurality of bits with each bit being associated with one or more data blocks of data blocks 212 and, when data of a data block is changed, the bit associated with that data block (or group of data blocks) is set to indicate that it has been changed. However, synchronization bitmap 220 differs from the tracking bitmap 214 in that it is configured to track "recovery writes" that occur when stale base component 204 is being brought back up to date by synchronizing at least a portion of data blocks 212 with equivalent data blocks of data blocks 216 of primary source mirror component 206.

As illustrated, when stale base component 204 becomes available and creates synchronization bitmap 220, an active mirrored component (e.g., primary source mirror component 206) that is not stale and that is associated with a tracking bitmap with a stale LSN that matches the stale LSN of the stale component (or is lower, but not set to one) is identified. The data of the stale component is synchronized with data of the identified active mirrored component. As illustrated in FIG. 2B, primary source mirror component 206 includes tracking bitmap 214 with a stale LSN 208*p* that matches stale LSN 208 of the base component 204, or is lower, but not equal to one. In some examples, there may be multiple mirrored components with matching tracking bitmaps and the mirrored component to be used in the synchronization process may be selected by the system based on a defined selection process without departing from the description herein.

After primary source mirror component 206 is selected to be used in the synchronization process for base component 204, data blocks to be copied from data blocks 216 of primary source mirror component 206 to data blocks 212 of base component 204 are identified based on the bits that are set in tracking bitmap 214 to indicate that the associated data blocks have been changed since the write I/O associated with stale LSN 208 has been committed. At least a portion of those identified data blocks are copied to the equivalent data blocks in the data blocks 212 using recovery write operations or recovery writes. In some examples, recovery writes are similar to other write I/O in that they include writing to address locations in the data blocks of a component in order to change, organize, and/or store data values, but recovery writes are used to synchronize components within distributed data object 202 as described herein, rather than being received from outside distributed data object 202 from other sources. Further, recovery writes may not be associated with LSNs and the sequence in which recovery writes occur may not match the sequence of the write I/Os that originally caused the changes to data blocks that are being synchronized by the recovery writes. For instance, the synchronization of data blocks 212 with data blocks 216 (by copying changed data blocks from data blocks 216 to data blocks 212) may be performed in address order (e.g., the changed data block with the lowest address is copied first, then the changed data block with the second lowest address, etc.). Other sequences of recovery writes may also be used during the synchronization process without departing from the description herein.

As the changed data blocks are copied from data blocks 216 to data blocks 212, the associated bits in synchronization bitmap 220 are set to indicate the changes to data blocks 212, thereby tracking all changes made during the synchronization process. As a result, base component 204 is brought up to date from being stale and it has access to a record of all changes made to the address space since the write I/O associated with stale LSN 208 was committed prior to its unavailability. This change record tracked in synchronization bitmap 220 may be used when other mirrored components need to be synchronized to be brought up to date, as described herein.

Figure 3:
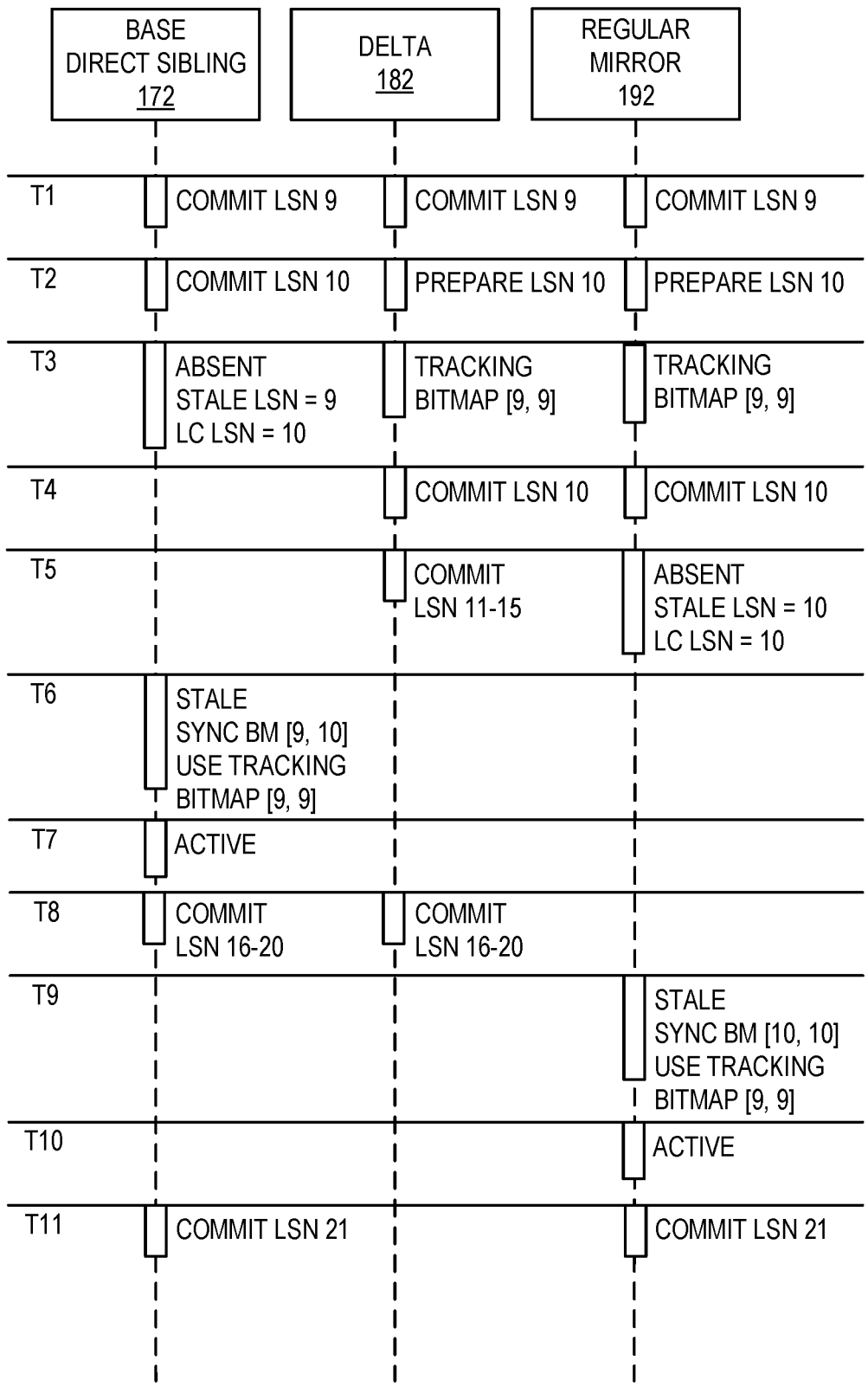
FIG. 3 is a sequence diagram illustrating a process of managing unavailable components in the architecture of FIG. 1A, using synchronization bitmaps.

FIG. 3 is a sequence diagram illustrating a process 300 of managing unavailable components in architecture 100, using synchronization bitmaps. In some examples, portions of process 300 are performed by one or more computing apparatus 618 of FIG. 6. Process 300 is represented by a plurality of points in time and/or periods of time T1-T11. FIG. 3 makes reference to base component 172, delta component 182, and regular mirror component 192. As noted above, base component 172 is a direct sibling of a delta component 182, and regular mirror component 192 is an indirect sibling. Also as noted above, FIG. 2B may depict multiple scenarios, such as one scenario in which base component 172 (represented as base component 204) is synchronized using delta component 182 (represented as primary source mirror component 206) or base component 172 is synchronized using regular mirror component 192 (also represented as primary source mirror component 206, in this alternative scenario).

At T1, a write I/O assigned an LSN of 9 is committed by each of components 172, 182, and 192. In some examples, write I/Os are committed according to a protocol that includes preparing the write I/O and committing the write I/O, such as a two-phase commit (2PC) protocol or another type of atomic commit protocol. Alternatively, or additionally, the write I/Os may be committed with another protocol or method, without departing from the description herein.

At T2, a write I/O assigned an LSN of 10 is prepared at all three components 172, 182, and 192, but it is only committed by base component 172 before acknowledging back to the system. In some examples, base component 172 records or otherwise tracks that the LSN 10 write I/O has been committed, but the other components and/or other parts of the system may not have access to that information.

At T3, base component 172 goes absent (becomes unavailable). In some examples, base component 172 goes offline such that other components of the system are unable to communicate or interact with base component 172. This may be caused by, for instance, a host device associated with base component 172 malfunctioning, losing network connectivity, transitioning to a maintenance mode, or the like. A stale LSN of 9 is associated with base component 172, representing the last write I/O that was committed by all the active components 172, 182, and 192 prior to base component 172 becoming unavailable. Further, base component 172 is associated with a last committed LSN of 10, though the write I/O associated with LSN 10 was not committed to any of the other components 182 and 192.

Additionally, based on the system detecting the unavailability of base component 172, tracking bitmaps are created in association with each of the remaining active mirror components 182 and 192. Each of the created tracking bitmaps is associated with the determined stale LSN value of 9 to indicate the starting point at which write I/O and/or other changes are tracked by the tracking bitmaps. Additionally, or alternatively, the created tracking bitmaps may be associated with an LSN range from the stale LSN to the last committed LSN of unavailable base component 172. In cases where the stale LSN and last committed LSN are different values, associated the tracking bitmap with the range of the two values may be used to determine whether the tracking bitmap should be selected for use in a synchronization process as described herein.

At T4, the write I/O associated with LSN 10 is committed by components 182 and 192. The committing of the write I/O includes writing data to one or more data blocks of each component and, as a result, the tracking bitmaps that were created at T3 are updated such that the bits associated with the changed data blocks are set to indicate that the data blocks have been changed since the stale LSN of 9 of the tracking bitmaps.

At T5, write I/Os associated with LSNs 11, 12, 13, 14, and 15 are committed by each of the components that are still active, which in this case is only delta component 182. Further, the changes made during the committing of those write I/Os are tracked in the tracking bitmap associated with a stale LSN of 9 of delta component 182. Also at T5, regular mirror component 192 goes absent (becomes unavailable) and is associated with a stale LSN of 10 and a last committed LSN also of 10. Because base component 172 remains unavailable, the data writes associated with the write I/Os of LSNs 11-15 are not performed on the data blocks of base component 172 or regular mirror component 192, such that they are both now out of sync or out of date with respect to delta component 182.

At T6, base component 172 becomes available again. Because its stale LSN is 9 and write I/Os with LSNs up to 15 have been committed on delta component 182, base component 172 is in a stale state. To enable changes made during the upcoming synchronization process to be tracked, a synchronization bitmap (sync BM) is created for base component 172 and it is associated with the LSN range from stale LSN 9 to last committed LSN 10 of base component 172. Then, a tracking bitmap and associated mirrored component is identified and selected to be used in the synchronization process to bring base component 172 up to date. In this case, one of the tracking bitmap associated with the stale LSN of 9 is identified and selected, such as the tracking bitmap of delta component 182. The selected tracking bitmap is used to determine the synchronization workload, including identifying data blocks that have been changed since the write I/O associated with LSN 9. Those identified data blocks are copied to the equivalent data blocks of base component 172 using recovery write operations as described herein. The synchronization process of base component 172 may take significant time, especially if the write I/Os that base component 172 missed out on changed many different data blocks. As illustrated, the synchronization process takes from where it starts at T6 until the recovery writes are complete at T7.

At T7, base component 172 is active again, because it is now up to date, although regular mirror component 192 remains absent (unavailable).

At T8, write I/Os having associated LSNs of 16-20 are committed to the active components, base component 172 and delta component 182. Further, based on the data changed by those write I/Os in the address space of the mirrored component, the tracking bitmap associated with the stale LSN of 9 (e.g., created when base component 172 became unavailable) is updated to indicate the data blocks that were changed by the write I/Os associated with LSNs 10-20.

At T9, regular mirror component 192 becomes available again. Because its stale LSN is 10 and write I/Os with LSNs up to 20 have been committed on other active components (e.g., delta component 182 and base component 172), regular mirror component 192 is in a stale state. To enable changes made during the upcoming synchronization process to be tracked, a synchronization bitmap (sync BM) is created for regular mirror component 192 and it is associated with LSN 10. Then, a tracking bitmap and associated mirrored component is identified and selected to be used in the synchronization process to bring regular mirror component 192 up to date. In this case, the tracking bitmap associated with the stale LSN of 9 on delta component 182 is identified and selected, because a tracking bitmap associated with the stale LSN of 9 will contain a record of data changes that are needed for a stale component with a stale LSN of 10. The selected tracking bitmap is used to determine the synchronization workload, including identifying data blocks that have been changed since the write I/O associated with LSN 9. Those identified data blocks are copied to data blocks of regular mirror component 192 using recovery write operations as described herein. The synchronization process of regular mirror component 192 may take significant time, especially if the write I/Os that regular mirror component 192 missed out on changed many different data blocks. As illustrated, the synchronization process takes from where it starts at T9 until the recovery writes are complete at T10.

At T10, regular mirror component 192 is active again, because it is now up to date.

At T11, a write I/O assigned an LSN of 9 is committed by each of base component 172 and regular mirror component 192. Delta component 182 has ceased to be active, because it is no longer needed for any synchronizing after any planned outages.

Figure 4:
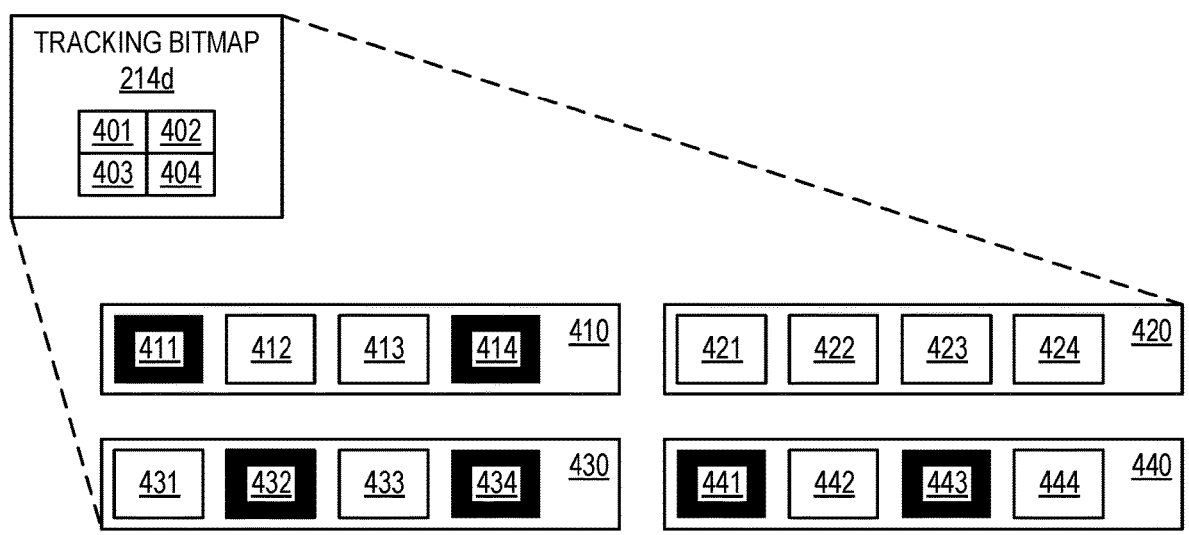
FIG. 4 illustrates a relationship between a tracking bitmap and data blocks, as may be encountered in the architecture of FIG. 1.

FIG. 4 illustrates a relationship between a tracking bitmap (e.g., tracking bitmap 214d) and data blocks (e.g., data blocks within data blocks 216d). Tracking bitmap 214d is illustrated as having four bits, bit 401, bit 402, bit 403, and bit 404. It should be understood that tracking bitmaps having a much larger number of bits, for example numbering in the thousands, may be used in some examples. As illustrated, bits 401-404 each corresponds to a group of data blocks. For example, bit 401 corresponds to a group of data blocks 410, bit 402 corresponds to a group of data blocks 420, bit 403 corresponds to a group of data blocks 430, and bit 404 corresponds to a group of data blocks 440.

Group of data blocks 410 comprises data block 411, data block 412, data block 413, and data block 414. Group of data blocks 420 comprises data block 421, data block 422, data block 423, and data block 424. Group of data blocks 430 comprises data block 431, data block 432, data block 433, and data block 434. Group of data blocks 440 comprises data block 441, data block 442, data block 443, and data block 444. In some examples, data blocks 411-440 are 4 kilobyte (KB) data blocks.

Cross-hatched data blocks 411, 414, 432, 434, 441, and 443 are data blocks that have actually been written during the lifespan of delta component 182. The other data blocks 412, 413, 421, 422, 423, 424, 431, 433, 442, and 444 are data blocks that have not been written during the lifespan of delta component 182. Because data blocks 411 and 414 are within group of data blocks 410, bit 401 of tracking bitmap 214d is set to '1'. Because no data blocks within group of data blocks 420 have been written during the lifespan of delta component 182, bit 402 of tracking bitmap 214d is to '0'. Because data blocks 432 and 434 are within group of data blocks 430, bit 403 of tracking bitmap 214d will be set to '1'. Because data blocks 441 and 443 are within group of data blocks 440, bit 404 of tracking bitmap 214d will be set to '1'.

Figure 5A:
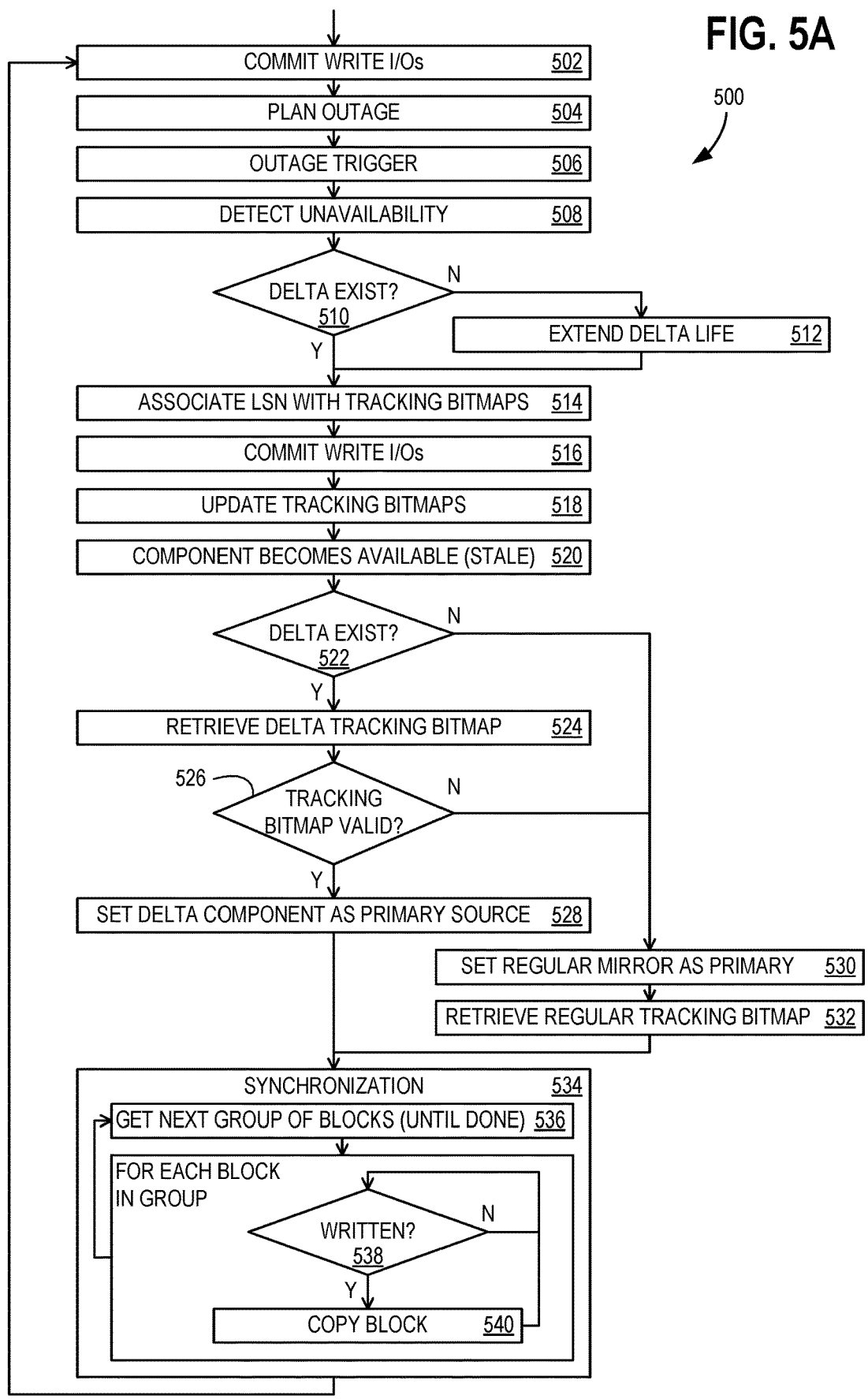
FIG. 5A illustrates a flowchart of exemplary operations associated with the architecture of FIG. 1.

FIG. 5A illustrates a flowchart 500 of exemplary operations associated with hybrid synchronization using a shadow component (e.g., hybrid synchronization for a distributed object). In some contexts, synchronizing a component after an absence, to bring it up to date, may be referred to as resynchronizing the component. In some examples, the operations of flowchart 500 are performed by one or more computing apparatus 618 of FIG. 6. Operation 502 includes prior to unavailability of a first component (e.g., base component 172), committing at least one write I/O by the first component and a regular mirror component (e.g., regular mirror component 192). At 504, an outage is planned, and an outage trigger (e.g., maintenance) occurs at 506.

Operation 508 includes detecting, by a processor (e.g., processor 619), the first component of a plurality of mirrored components (e.g., plurality of mirrored components 170) of a distributed data object (e.g., distributed data object 202) becoming unavailable. The plurality of mirrored components includes a delta component (e.g., delta component 182) and the regular mirror component. In some examples, the delta component indicates a shorter history of changes to data blocks of an LFS than as indicated by the regular mirror component. For example, because the delta component has a shorter lifespan (e.g., being initiated upon the planned outage of the base component, rather than having operated for a longer term like a regular mirror component), the delta component will have a shorter history of changes than the regular mirror component. In some examples, the first component is a storage component of the LFS. In some examples, the first component and the delta component have a same address space. In some examples, the first component has a longer lifespan than the delta component. In some examples, the regular mirror component has a longer lifespan than the delta component. In some examples, the first component is an indirect sibling of the delta component.

Decision operation 510 determines whether a delta component exists that is a sibling of the first component. This is the case when the first component is base component 172 or regular mirror component 192. If so, operation 512 includes, based at least on the first component becoming unavailable, extending a lifespan of the delta component. This prevents the delta component from terminating in the event that the direct sibling becomes available again and completes resynchronization (e.g., an event which may be planned as a trigger for terminating the delta component), but the indirect sibling remains absent. If the delta component is terminated on the original schedule (when the direct sibling is synchronized), then it will not be available for efficiently resynchronizing the indirect sibling (the regular mirror component).

Operation 514 includes associating, by the processor, an LSN with a first tracking bitmap (e.g., tracking bitmap 214d) and also associating, by the processor, the LSN with a second tracking bitmap (e.g., tracking bitmap 214m). Operation 516 includes, during the unavailability of the first component, committing at least one write I/O by the delta component and, during the unavailability of the first component, committing the at least one write I/O by the regular mirror component. Operation 518 includes, during the unavailability of the first component, tracking the committing by the delta component in a first tracking bitmap associated with the delta component. The first tracking bitmap is updated based on a data block of the delta component being changed. Operation 518 also includes, during the unavailability of the first component, tracking the committing by the regular mirror component in a second tracking bitmap associated with the regular mirror component. The second tracking bitmap is updated based on a data block of the regular mirror component being changed. Operation 520 includes detecting, by the processor, the first component becoming available. Upon becoming available, the first component is stale with respect to at least one active component of the plurality of mirrored components.

Decision operation 522 includes, based at least on detecting the first component becoming available, detecting, by the processor, availability of the delta component for synchronizing the first component. If the delta component is available, the For example, the tracking bitmap associated with the delta component is retrieved at 524. Decision operation 526 includes, based at least on detecting the first component becoming available, detecting, by the processor, whether the first tracking bitmap is valid for synchronizing the first component. If the first tracking bitmap has an LSN set to one (1), it is not qualified as a synchronization source. However, if the LSN is greater than one, the delta component is set as the primary synchronization source (e.g., primary source mirror component 206).

In this scenario (the delta component exists and has a valid tracking bitmap), operation 534 below will comprise, based at least on detecting the first component becoming available, synchronizing, by the processor, the first component with data from the delta component, based at least on changed data blocks indicated in the first tracking bitmap. In some examples, operation 534 will comprise, based at least on the delta component being available and/or the first tracking bitmap being valid for synchronizing the first component, synchronizing, by the processor, the first component with data from the delta component, based at least on changed data blocks indicated in the first tracking bitmap. In some examples, when the delta component is set as the primary synchronization source, the data blocks may be copied from either the delta component or the regular mirror component. In such examples, operation 534 will comprise, based at least on the delta component being available and/or the first tracking bitmap being valid for synchronizing the first component, synchronizing, by the processor, the first component with data from the regular mirror component, based at least on changed data blocks indicated in the first tracking bitmap.

If, however, either decision operation 522 or decision operation 526 returns a "No" result, flowchart 500 moves to operation 530 in which the regular mirror component is set as the primary synchronization source. At 532, the tracking bitmap (e.g., tracking bitmap 214m) is retrieved from the regular mirror component. In this scenario, operation 534 below will comprise either: based at least on the delta component being unavailable, synchronizing, by the processor, the first component with data from the regular mirror component, based at least on changed data blocks indicated in the second tracking bitmap; or, based at least on the first tracking bitmap not being valid for synchronizing the first component, synchronizing, by the processor, the first component with data from the regular mirror component, based at least on changed data blocks indicated in the second tracking bitmap.

Operation 534 is the synchronization of the first component, using either the delta component or the regular mirror component, as selected above in operation 528 or 530. Synchronization operation 534 comprises operations 536-540, which repeat until synchronization of the first component is complete. Upon completion of operation 534, flowchart 500 returns to operation 502. The current group of blocks, corresponding to the current bit being operated upon in the tracking bitmap, is retrieved at 536. Initially, this is the first bit of the tracking bitmap, with a value set to '1' (bits with a value set to '0' may be skipped). This current bit then steps through the tracking bitmap, for each bit with a value set to '1' until reaching the end of the tracking bitmap. In this manner, the data blocks in the delta component, which are mapped by the tracking bitmap will be retrieved, if their corresponding tracking bitmap bit has a value of '1'.

For each data block in the group of blocks decision operation 538 comprises detecting, by the processor, whether a data block, in a group of data blocks indicated as changed, has been written. If a block has been written, operation 540 includes, based at least on the data block having been written, copying the data block to the first component.

FIG. 5B illustrates a flowchart 570 of exemplary operations associated with hybrid synchronization using a shadow component (e.g., hybrid synchronization for a distributed object using a shadow component). In some examples, the operations of flowchart 570 are performed by one or more computing apparatus 618 of FIG. 6. Operation 572 includes detecting, by a processor, a first component of a plurality of mirrored components of a distributed data object becoming unavailable, wherein the plurality of mirrored components includes a delta component and a regular mirror component, and wherein the delta component indicates a shorter history of changes to data blocks of an LFS than is indicated by the regular mirror component. Operation 574 includes, during the unavailability of the first component, committing at least one write I/O by the delta component. Operation 576 includes, during the unavailability of the first component, tracking the committing by the delta component in a first tracking bitmap, wherein the first tracking bitmap is associated with the delta component. Operation 578 includes detecting, by the processor, the first component becoming available. Operation 580 includes, based at least on detecting the first component becoming available, synchronizing, by the processor, the first component with data from the delta component, based at least on changed data blocks indicated in the first tracking bitmap.

ADDITIONAL EXAMPLES

An exemplary computer system for synchronization (e.g., hybrid synchronization using a shadow component) comprises: a processor; and a non-transitory computer readable medium having stored thereon program code, the program code causing the processor to: detect, by the processor, a first component of a plurality of mirrored components of a distributed data object becoming unavailable, wherein the plurality of mirrored components includes a delta component and a regular mirror component, and wherein the delta component indicates a shorter history of changes to data blocks of an LFS than is indicated by the regular mirror component; during the unavailability of the first component, commit at least one write I/O by the delta component; during the unavailability of the first component, track the committing by the delta component in a first tracking bitmap associated with the delta component; detect, by the processor, the first component becoming available; and based at least on detecting the first component becoming available, synchronize, by the processor, the first component with data from the delta component, based at least on changed data blocks indicated in the first tracking bitmap.

An exemplary method of synchronization (e.g., hybrid synchronization using a shadow component) comprises: detecting, by a processor, a first component of a plurality of mirrored components of a distributed data object becoming unavailable, wherein the plurality of mirrored components includes a delta component and a regular mirror component, and wherein the delta component indicates a shorter history of changes to data blocks of an LFS than is indicated by the regular mirror component; during the unavailability of the first component, committing at least one write I/O by the delta component; during the unavailability of the first component, tracking the committing by the delta component in a first tracking bitmap associated with the delta component; detecting, by the processor, the first component becoming available; and based at least on detecting the first component becoming available, synchronizing, by the processor, the first component with data from the delta component, based at least on changed data blocks indicated in the first tracking bitmap.

An exemplary non-transitory computer readable storage medium has stored thereon program code executable by a first computer system at a first site, the program code embodying a method comprising: detecting, by the processor, a first component of a plurality of mirrored components of a distributed data object becoming unavailable, wherein the plurality of mirrored components includes a delta component and a regular mirror component, and wherein the delta component indicates a shorter history of changes to data blocks of an LFS than is indicated by the regular mirror component; during the unavailability of the first component, committing at least one write I/O by the delta component; during the unavailability of the first component, tracking the committing by the delta component in a first tracking bitmap associated with the delta component; detecting, by the processor, the first component becoming available; and based at least on detecting the first component becoming available, synchronizing, by the processor, the first component with data from the delta component, based at least on changed data blocks indicated in the first tracking bitmap.

Alternatively, or in addition to the other examples described herein, examples include any combination of the following:

during the unavailability of the first component, committing the at least one write I/O by the regular mirror component;

during the unavailability of the first component, tracking the committing by the regular mirror component in a second tracking bitmap associated with the regular mirror component;

based at least on detecting the first component becoming available, detecting, by the processor, availability of the delta component for synchronizing the first component;

based at least on the delta component being unavailable, synchronizing, by the processor, the first component with data from the regular mirror component, based at least on changed data blocks indicated in the second tracking bitmap;

based at least on detecting the first component becoming available, detecting, by the processor, whether the first tracking bitmap is valid for synchronizing the first component;

based at least on the first tracking bitmap not being valid for synchronizing the first component, synchronizing, by the processor, the first component with data from the regular mirror component, based at least on changed data blocks indicated in the second tracking bitmap;

the first component is an indirect sibling of the delta component;

synchronizing comprises detecting, by the processor, whether a data block, in a group of data blocks indicated as changed, has been written;

synchronizing further comprises, based at least on the data block having been written, copying the data block to the first component;

based at least on the first component becoming unavailable, extending a lifespan of the delta component;

upon becoming available, the first component is stale with respect to at least one active component of the plurality of mirrored components;

the first tracking bitmap is updated based on a data block of the delta component being changed;

the second tracking bitmap is updated based on a data block of the regular mirror component being changed;

based at least on the delta component being available and/or the first tracking bitmap being valid for synchronizing the first component, synchronizing, by the processor, the first component with data from the delta component, based at least on changed data blocks indicated in the first tracking bitmap;

based at least on the delta component being available and/or the first tracking bitmap being valid for synchronizing the first component, synchronizing, by the processor, the first component with data from the regular mirror component, based at least on changed data blocks indicated in the first tracking bitmap;

synchronizing the first component comprises resynchronizing the first component;

the first component is a storage component of the LFS;

associating, by the processor, an LSN with the first tracking bitmap;

associating, by the processor, the LSN with the second tracking bitmap;

the first component and the delta component have a same address space;

the first component has a longer lifespan than the delta component; and the regular mirror component has a longer lifespan than the delta component.

EXEMPLARY OPERATING ENVIRONMENT

Figure 6:
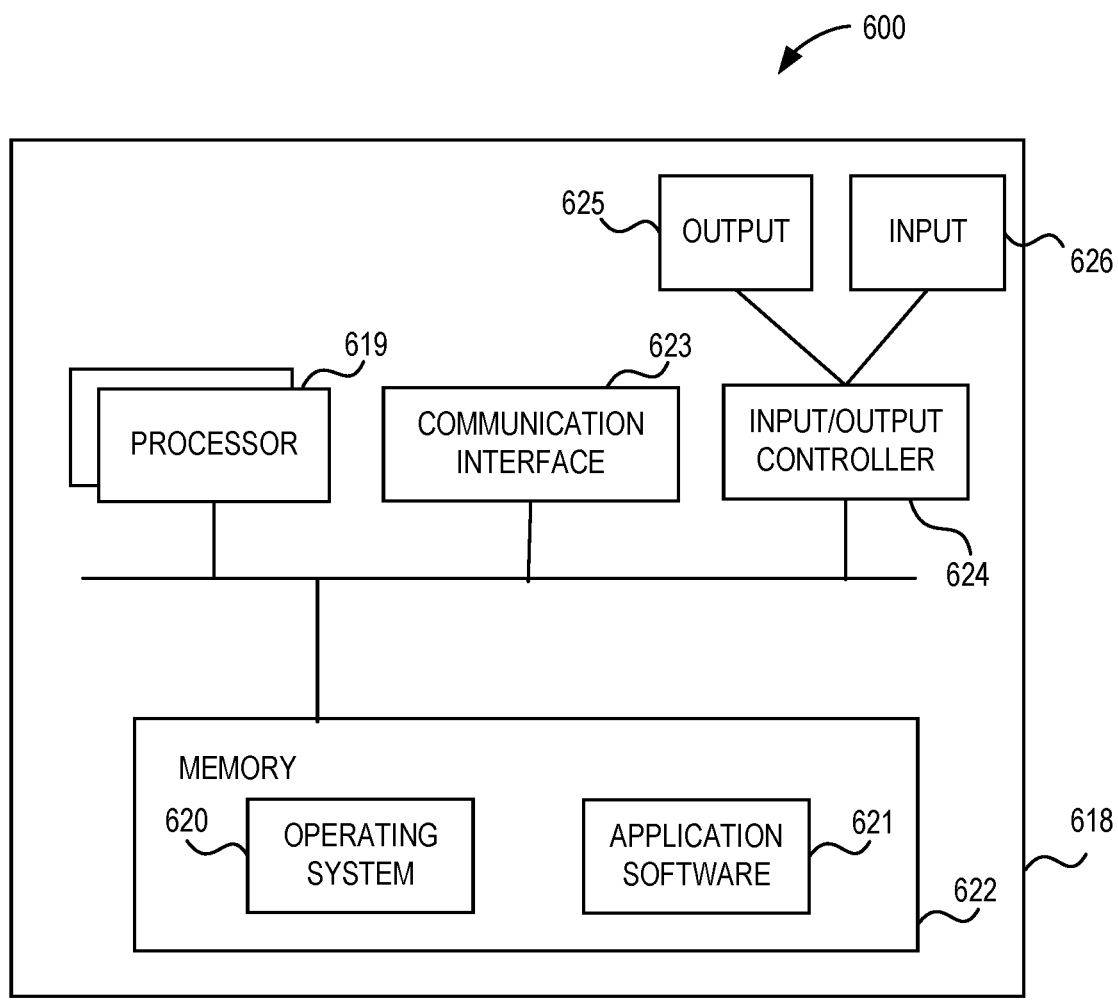
FIG. 6 illustrates a block diagram of a computing apparatus that may be used as a component of the architecture of FIG. 1A, according to an example.

The present disclosure is operable with a computing apparatus (computing device) according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hardcoded machine. Platform software comprising an operating system 620 or any other suitable platform software may be provided on the apparatus 618 to enable application software 621 to be executed on the device. According to an embodiment, tracking component changes during a synchronization process using synchronization bitmaps and using the synchronization bitmaps during synchronization processes as described herein may be accomplished by software, hardware, and/or firmware.

Computer executable instructions may be provided using any computer-readable medium (e.g., any non-transitory computer storage medium) or media that are accessible by the computing apparatus 618. Computer-readable media may include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone, or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

The operations described herein may be performed by a computer or computing device. The computing devices comprise processors and computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, NVMe devices, persistent memory devices, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device" and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples may have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," and "the" are intended to mean that there are one or more of the elements. The terms "comprising," "including," and "having" are intended to be inclusive and mean that there may be additional elements other than the listed elements. The term "exemplary" is intended to mean "an example of"

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:
    based on a planned outage, detecting, by a processor, a first component of a plurality of mirrored components of a distributed data object becoming unavailable, wherein the plurality of mirrored components includes an empty delta component that is initiated upon the planned outage of the first component, and a regular mirror component, and wherein the delta component contains fewer changes to data blocks of a log-structured file system (LFS) than changes to data blocks of the regular mirror component;
    during the unavailability of the first component, committing at least one write input/output (I/O) by the delta component and the regular mirror component;
    during the unavailability of the first component, tracking the committing by the delta component in a first tracking bitmap and the committing by the regular mirror component in a second tracking bitmap;
    associating a log sequence number (LSN) with the first tracking bitmap;
    detecting, by the processor, the first component becoming available;
    based on a value of the LSN meeting a threshold, determining whether the first tracking bitmap is valid;
    based at least on detecting the first component becoming available and determining that the first tracking bitmap is valid, synchronizing, by the processor, the first component with data from the delta component, using changed data blocks indicated in the first tracking bitmap; and based at least on detecting the first component becoming available and determining that the first tracking bitmap is not valid, synchronizing, by the processor, the first component with data from the regular mirror component, using changed data blocks indicated in the second tracking bitmap.

2. The method of claim 1, wherein the delta component and the first component have a same address space.

3. The method of claim 1, further comprising:
synchronizing another regular mirror component using the delta component.

4. The method of claim 1, wherein determining that the first tracking bitmap is valid includes setting the delta component as a primary synchronizing source.

5. The method of claim 1, wherein the delta component contains data that the first component did not receive during the unavailability of the first component.

6. The method of claim 1, further comprising:
based at least on the first component becoming unavailable, extending a lifespan of the delta component.

7. The method of claim 1, wherein synchronizing comprises:
detecting, by the processor, whether a data block, in a group of data blocks indicated as changed, has been written; and
based at least on the data block having been written, copying the data block to the first component.

8. A computer system comprising:
a processor; and
a non-transitory computer readable medium having stored thereon program code, the program code causing the processor to:
based on a planned outage, detect, by the processor, a first component of a plurality of mirrored components of a distributed data object becoming unavailable, wherein the plurality of mirrored components includes an empty delta component and a regular mirror component, and wherein the delta component contains fewer changes to data blocks of a log-structured file system (LFS) than changes to the data blocks of the regular mirror component;
during the unavailability of the first component, commit at least one write input/output (I/O) by the delta component and the regular mirror component;
during the unavailability of the first component, track the committing by the delta component in a first tracking bitmap and the committing by the regular mirror component in a second tracking bitmap;
associate a log sequence number (LSN) with the first tracking bitmap;
detect, by the processor, the first component becoming available;
based on a value of the LSN meeting a threshold, determine whether the first tracking bitmap is valid;
based at least on detecting the first component becoming available and determining that the first tracking bitmap is valid, synchronize, by the processor, the first component with data from the delta component, using changed data blocks indicated in the first tracking bitmap; and
based at least on detecting the first component becoming available and determining that the first tracking bitmap is not valid, synchronize, by the processor, the first component with data from the regular mirror component, using changed data blocks indicated in the second tracking bitmap.

9. The computer system of claim 8, wherein the delta component and the first component have a same address space.

10. The computer system of claim 8, wherein the program code is further operative to:
synchronize another regular mirror component using the delta component.

11. The computer system of claim 9, wherein the program code is further operative to:
based at least on detecting the first component becoming available, create a synchronization bitmap associated with the first component, the synchronization bitmap including a stale LSN and a last committed LSN of the first component.

12. The computer system of claim 8, wherein determining that the first tracking bitmap is valid includes setting the delta component as a primary synchronizing source.

13. The computer system of claim 12, wherein the delta component contains data that the first component did not receive during the unavailability of the first component.

14. The computer system of claim 8, wherein synchronizing comprises:
detecting, by the processor, whether a data block, in a group of data blocks indicated as changed, has been written; and
based at least on the data block having been written, copying the data block to the first component.

15. A non-transitory computer storage medium having stored thereon program code executable by a processor, the program code embodying a method comprising:
based on a planned outage, detecting, by the processor, a first component of a plurality of mirrored components of a distributed data object becoming unavailable, wherein the plurality of mirrored components includes an empty delta component that is initiated upon the planned outage of the first component, and a regular mirror component, and wherein the delta component contains fewer changes to data blocks of a log-structured file system (LFS) than changes to data blocks of the regular mirror component;
during the unavailability of the first component, committing at least one write input/output (I/O) by the delta component and the regular mirror component;
during the unavailability of the first component, tracking the committing by the delta component in a first tracking bitmap and the committing by the regular mirror component in a second tracking bitmap;
associating a log sequence number (LSN) with the first tracking bitmap;
detecting, by the processor, the first component becoming available;
based on a value of the LSN meeting a threshold, determining whether the first tracking bitmap is valid;
based at least on detecting the first component becoming available and determining that the first tracking bitmap is valid, synchronizing, by the processor, the first component with data from the delta component, using changed data blocks indicated in the first tracking bitmap; and
based at least on detecting the first component becoming available and determining that the first tracking bitmap is not valid, synchronizing, by the processor, the first component with data from the regular mirror component, using changed data blocks indicated in the second tracking bitmap.

16. The computer storage medium of claim 15, wherein the delta component and the first component have a same address space.

17. The computer storage medium of claim 15, wherein the program code further comprises:
   synchronizing another regular mirror component using the delta component.

18. The computer storage medium of claim 15, wherein determining that the first tracking bitmap is valid includes setting the delta component as a primary synchronizing source.

19. The computer storage medium of claim 15, wherein the delta component contains data that the first component did not receive during the unavailability of the first component.

20. The computer storage medium of claim 15, wherein synchronizing comprises:
   detecting, by the processor, whether a data block, in a group of data blocks indicated as changed, has been written; and
   based at least on the data block having been written, copying the data block to the first component.

* * * * *